(12) United States Patent
Inoue

(10) Patent No.: US 12,026,330 B2
(45) Date of Patent: Jul. 2, 2024

(54) CONDUCTIVE LAMINATE, TOUCH PANEL, AND MANUFACTURING METHOD FOR CONDUCTIVE LAMINATE

(71) Applicant: FUJIFILM Corporation, Tokyo (JP)

(72) Inventor: Daisuke Inoue, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 330 days.

(21) Appl. No.: 17/412,711

(22) Filed: Aug. 26, 2021

(65) Prior Publication Data

US 2021/0389834 A1 Dec. 16, 2021

Related U.S. Application Data

(63) Continuation of application No. PCT/JP2020/006546, filed on Feb. 19, 2020.

(30) Foreign Application Priority Data

Mar. 26, 2019 (JP) .................................. 2019-059120

(51) Int. Cl.
*G06F 3/041* (2006.01)
*B32B 17/10* (2006.01)
*C03C 17/38* (2006.01)

(52) U.S. Cl.
CPC ............. *G06F 3/041* (2013.01); *B32B 17/10* (2013.01); *C03C 17/38* (2013.01); *C03C 2217/253* (2013.01); *C03C 2217/26* (2013.01); *C03C 2218/114* (2013.01); *C03C 2218/156* (2013.01); *G06F 2203/04103* (2013.01)

(58) Field of Classification Search
CPC ...................................................... G06F 3/041
See application file for complete search history.

(56) References Cited

U.S. PATENT DOCUMENTS

| | | | |
|---|---|---|---|
| 2014/0375909 A1 | 12/2014 | Misaki | |
| 2015/0242011 A1 | 8/2015 | Yeh et al. | |
| 2016/0362586 A1* | 12/2016 | Kiyoto | ................... C09J 133/08 |
| 2017/0371453 A1* | 12/2017 | Nakayama | ............... H05K 1/09 |

(Continued)

FOREIGN PATENT DOCUMENTS

| | | |
|---|---|---|
| EP | 2983072 A1 | 2/2016 |
| JP | 2013-206315 A | 10/2013 |
| JP | 2014-150118 A | 8/2014 |

(Continued)

OTHER PUBLICATIONS

Office Action, issued by the Japanese Patent Office on Jul. 26, 2022, in connection with Japanese Patent Application No. 2021-508272.

(Continued)

*Primary Examiner* — William D Young
(74) *Attorney, Agent, or Firm* — Edwards Neils LLC; Jean C. Edwards, Esq.

(57) ABSTRACT

A conductive laminate includes a first organic film, a fine metal wire arranged on the first organic film, and a second organic film arranged to cover the fine metal wire, in which the fine metal wire includes a blackening layer, an intimate attachment layer, and a metal conductive layer in order from a side of the first organic film, and moisture contents of the first organic film and the second organic film are less than 3.00%.

17 Claims, 4 Drawing Sheets

(56) References Cited

U.S. PATENT DOCUMENTS

2019/0346971 A1* 11/2019 Ikeda .................. G06F 3/0446

FOREIGN PATENT DOCUMENTS

| JP | 2017-211826 A | | 11/2017 |
|---|---|---|---|
| JP | 2017211826 | * | 11/2017 |
| KR | 10-2015-0134010 A | | 12/2015 |
| WO | 2013/099776 A1 | | 7/2013 |
| WO | 2018/163565 A1 | | 9/2018 |

OTHER PUBLICATIONS

Asahi Kasei Corporation, Influence of Moisture Content, Delpet Technology Information, p. 2, retrieved on Jan. 24, 2020, https://www.akchem.com/pmma/tec/pdf/MTA00_etc_suibunritunoeikyou.pdf.
Office Action, issued by the State Intellectual property Office on Sep. 7, 2022, in connection with Chinese Patent Application No. 202080017349.X.
International Search Report Issued in PCT/JP2020/006546 on Apr. 7, 2020.
Written Opinion Issued in PCT/JP2020/006546 on Apr. 7, 2020.
International Preliminary Report on Patentability Issued in PCT/JP2020/006546 on Sep. 28, 2021.
Asahi Kasei Corporation, Effect of Moisture Percentage, Delpet Technical Information, p. 1, (4)-(6), retrieved on Mar. 24, 2020, https://www.akchem.com/pmma/tec/pdf/MTA00_etc_suibunritunoeikyou.pdf.
Office Action, issued by the Japanese Patent Office on Feb. 21, 2023, in connection with Japanese Patent Application No. 2021-508272.

* cited by examiner

CONDUCTIVE LAMINATE, TOUCH PANEL, AND MANUFACTURING METHOD FOR CONDUCTIVE LAMINATE

CROSS-REFERENCE TO RELATED APPLICATIONS

This application is a Continuation of PCT International Application No. PCT/JP2020/006546 filed on Feb. 19, 2020, which was published under PCT Article 21(2) in Japanese, and which claims priority under 35 U.S.C § 119(a) to Japanese Patent Application No. 2019-059120 filed on Mar. 26, 2019. The above applications are hereby expressly incorporated by reference, in their entirety, into the present application.

BACKGROUND OF THE INVENTION

1. Field of the Invention

The present invention relates to a conductive laminate, a touch panel, and a manufacturing method for a conductive laminate.

2. Description of the Related Art

A conductive substrate having a fine metal wire is widely used in various use applications in, for example, a touch panel, a solar cell, and an electroluminescence (EL) element. In particular, in recent years, the mounting rate of touch panels on mobile phones and mobile game devices has been increasing, and the demand for the conductive substrate for a capacitance type touch panel that makes multi-point detection possible is rapidly expanding.

For example, JP2013-206315A discloses a touch panel sensor in which a blackening layer and a copper wiring line are arranged on a substrate.

SUMMARY OF THE INVENTION

Usually, for the intended purpose of protecting a fine metal wire, an organic film may be arranged to cover the fine metal wire arranged on the organic film.

The inventors of the present invention arranged an intimate attachment layer between a blackening layer and a metal conductive layer for the purpose of improving the adhesiveness between the blackening layer and the metal conductive layer, further arranged an organic film on the obtained fine metal wire to obtain a conductive laminate, and as a result of examining the characteristics of the obtained conductive laminate, found that in a case where the conductive laminate is allowed to stand in a high temperature environment, there is a case where the disconnection of the fine metal wire occurs. The disconnection of the fine metal wire did not depend on the width of the fine wire.

In consideration of the above circumstances, an object of the present invention to provide a conductive laminate in which the disconnection of a fine metal wire is suppressed in a case where the conductive laminate is allowed to stand in a high temperature environment.

Another object of the present invention is to provide a touch panel and a manufacturing method for a conductive laminate.

The inventors of the present invention have conducted intensive studies to solve the above-described problems, and as a result, have found that the above-described problems can be solved by the following configurations.

(1) A conductive laminate comprising:
a first organic film;
a fine metal wire arranged on the first organic film; and
a second organic film arranged to cover the fine metal wire,
in which the fine metal wire includes a blackening layer, an intimate attachment layer, and a metal conductive layer in order from a side of the first organic film, and
moisture contents of the first organic film and the second organic film are less than 3.00%.

(2) The conductive laminate according to (1), in which the moisture contents are less than 1.00%.

(3) The conductive laminate according to (1) or (2), in which the blackening layer and the intimate attachment layer contain the same metal atom.

(4) The conductive laminate according to any one of (1) to (3), in which the first organic film and the second organic film are made of the same material.

(5) The conductive laminate according to any one of (1) to (4), in which a line width of the fine metal wire gradually decreases from the side of the first organic film to a side of the second organic film.

(6) The conductive laminate according to any one of (1) to (5), in which an inorganic film containing at least one metal atom selected from the group consisting of Si, Al, and Ti is arranged between the fine metal wire and the second organic film to cover the fine metal wire.

(7) The conductive laminate according to (6), in which the inorganic film contains at least one selected from the group consisting of $SiO_2$, SiON, SiN, $Al_2O_3$, and $TiO_2$.

(8) The conductive laminate according to any one of (1) to (7), in which the metal conductive layer contains at least one metal atom selected from the group consisting of Cu, Al, and Ag.

(9) The conductive laminate according to any one of (1) to (8), in which the blackening layer contains at least one metal atom selected from the group consisting of Mo, Nb, Cr, Ti, and W.

(10) The conductive laminate according to any one of (1) to (9), further comprising a support on a side of the first organic film opposite to a side of the second organic film.

(11) The conductive laminate according to (10), in which the support is a glass substrate.

(12) A touch panel comprising the conductive laminate according to any one of (1) to (11).

(13) A manufacturing method for a conductive laminate, comprising:
a step of forming a first organic film;
a step of forming a fine metal wire on the first organic film; and
a step of forming a second organic film to cover the fine metal wire,
in which the fine metal wire includes a blackening layer, an intimate attachment layer, and a metal conductive layer in order from a side of the first organic film, and
moisture contents of the first organic film and the second organic film are less than 3.00%.

According to the present invention, it is possible to provide a conductive laminate in which the disconnection of a fine metal wire is suppressed in a case where the conductive laminate is allowed to stand in a high temperature environment.

Further, according to the present invention, it is possible to provide a touch panel and a manufacturing method for a conductive laminate.

DESCRIPTION OF THE PREFERRED EMBODIMENTS

Hereinafter, suitable aspects of the present invention will be described.

A numerical value range represented using "to" in the present specification means a range including the numerical values described before and after "to" as the lower limit and the upper limit respectively.

Further, in the present specification, the "organic film" (a first organic film to a third organic film described later) means a film containing a carbon atom, and a heteroatom other than the carbon atom (for example, a silicon atom, a nitrogen atom, or an oxygen atom) may be contained.

A feature point of the conductive laminate according to the embodiment of the present invention is that an organic film having a low moisture content is used. In the present invention, a fine metal wire including an intimate attachment layer and a metal conductive layer is surrounded by an organic film having a low moisture content, and thus the peeling between the intimate attachment layer and the metal conductive layer is suppressed, whereby disconnection is suppressed.

First Embodiment

Figure 1:
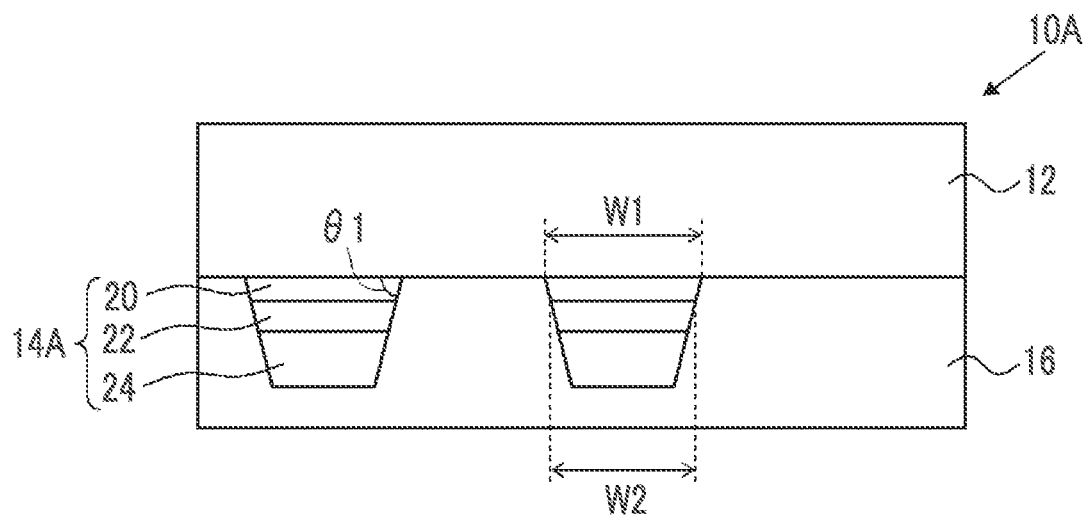
FIG. 1 is a cross-sectional view of a first embodiment of a conductive laminate.

Hereinafter, a first embodiment of the conductive laminate according to the embodiment of the present invention will be described with reference to the drawings. FIG. 1 shows a cross-sectional view of the first embodiment of the conductive laminate of the present invention.

A conductive laminate 10A includes a first organic film 12, a fine metal wire 14A, and a second organic film 16. The fine metal wire 14A includes a blackening layer 20, an intimate attachment layer 22, and a metal conductive layer 24 in order from a side of the first organic film 12. The fine metal wire 14A arranged on the first organic film 12 is covered by the second organic film 16. That is, the fine metal wire 14A is surrounded by the first organic film 12 and the second organic film 16. In a case where the conductive laminate 10A is applied to a touch panel, it is preferable to arrange the conductive laminate 10A in the touch panel so that the blackening layer 20 in the fine metal wire 14A is arranged on the visible side from the metal conductive layer 24.

Hereinafter, each of the members included in the conductive laminate 10A will be described in detail.
(First Organic Film)

The first organic film is one of the members that support the fine metal wire.

The moisture content of the first organic film is less than 3.00%. Among the above, the moisture content thereof is preferably less than 1.00% and more preferably 0.40% or less in that the disconnection of the fine metal wire is further suppressed (hereinafter, also simply referred to as "in that the effects of the present invention are more excellent") in a case where the conductive laminate is allowed to stand in a high temperature environment. The lower limit thereof is not particularly limited; however, it is 0.001% or more in many cases.

Examples of the measuring method for the moisture content include a method in which an object to be measured is humidity-controlled for 24 hours in an environment of a temperature of 25° C. and a humidity of 50%, and the moisture content is measured by the Karl Fischer method (150° C., vaporization method).

In the present specification, the "Karl Fischer method (150° C., vaporization method)" refers to measuring a moisture amount by the moisture vaporization method at a vaporization temperature of 150° C. using a Karl Fischer moisture meter according to the description of JIS K0113.

The thickness of the first organic film is not particularly limited; however, it is preferably 0.5 to 5.0 μm and more preferably 1.0 to 3.0 μm in that the effects of the present invention are more excellent.

The material constituting the first organic film is not particularly limited, and any material satisfying the above-described moisture content may be used, and a resin is preferable. Examples thereof include a (meth)acrylic resin, a polystyrene resin, a polyolefin resin, a fluororesin, a polyimide resin, a fluorinated polyimide resin, a polyurethane resin, a polyether ether ketone resin, a polycarbonate resin, and a silicon-containing resin, and a (meth)acrylic resin or a silicon-containing resin is preferable.

The (meth)acrylic resin is a wording that includes both an acrylic resin and a methacrylic resin.

In addition, the silicon-containing resin means an organic resin containing a silicon atom. Examples of the silicon-containing resin include a polysilazane having an organic group and an organic resin containing a silsesquioxane structure.

The (meth)acrylic resin preferably has a carbon ring from the viewpoint of lowering the moisture content in the organic film. Examples of the carbon ring include aliphatic rings such as a cyclohexane ring, and aromatic rings such as a benzene ring, a naphthalene ring, a fluorene ring, an anthracene ring, and a phenanthrene ring.

The carbon ring may be a monocyclic ring or a multicyclic ring.

The carbon ring is preferably a benzene ring or a fluorene ring, and a fluorene ring is more preferable.

Examples of the monomer that can constitute a repeating unit contained in the (meth)acrylic resin include acrylic acid esters such as methyl acrylate, ethyl acrylate, and butyl acrylate; and methacrylic acid esters such as methyl methacrylate, ethyl methacrylate, and butyl methacrylate.

The (meth)acrylic resin may be a homopolymer of one derivative of (meth)acrylic acid, may be a copolymer of two or more derivatives of (meth)acrylic acids, or may be a copolymer of these derivatives and another polymerizable monomer.

The weight-average molecular weight Mw of the (meth)acrylic resin is preferably 20,000 or more and more preferably 25,000 or more, and preferably 600,000 or less and more preferably 350,000 or less in that the effects of the present invention are more excellent.

The weight-average molecular weight (hereinafter, abbreviated as Mw) is a polystyrene-equivalent value obtained by gel permeation chromatography (GPC). Specific measurement conditions for GPC include the following measurement conditions.

GPC device: HLC-8320 (manufactured by Tosoh Corporation)

Column: TSK gel Super HZM-H, TSK gel Super HZ4000, and TSK gel Super HZ2000, used in combination (manufactured by Tosoh Corporation, 4.6 mm (inner diameter (ID))×15.0 cm)

Eluent: tetrahydrofuran (THF)

As the (meth)acrylic resin, one produced by a known method may be used, or a commercially available product may be used. Examples of the commercially available product include DELPET 60N and 80N (manufactured by Asahi Kasei Chemicals Corporation); and DIANAL BR80, BR83, BR85, BR88, BR95, BR110, and BR113 (manufactured by Mitsubishi Chemical Corporation).

In a case where the material constituting the first organic film is a resin, the resin may have a crosslinked structure.

Examples of the method for forming a resin having a crosslinked structure include a method of curing a polyfunctional monomer to obtain a resin.

The kind of the polymerizable group contained in the polyfunctional monomer is not particularly limited; however, examples thereof include a radically polymerizable group (for example, a (meth)acryloyl group) and a cationically polymerizable group.

The number of polymerizable groups contained in the polyfunctional monomer is not particularly limited; however, it is preferably 2 or more and more preferably 3 to 6.

In a case where a monomer is used in producing the first organic film, a polymerization initiator may be used in combination, as necessary. As the polymerization initiator, an optimum initiator is selected according to the polymerization type, and examples thereof include a radical polymerization initiator and a cationic polymerization initiator.

The method for forming the first organic film is not particularly limited, and known methods can be mentioned. Examples thereof include a method of forming a coating film using a composition containing a predetermined monomer and curing the coating film to form a first organic film, a method of applying a composition containing a predetermined resin and, as necessary, carrying out a drying treatment to form a first organic film, and a method of melting a resin to form a film shape.

(Fine Metal Wire)

The fine metal wire includes a blackening layer, an intimate attachment layer, and a metal conductive layer. Hereinafter, each of the layers will be described in detail.

The blackening layer is a layer for suppressing the reflection of light and reducing the visibility of the fine metal wire.

The material constituting the blackening layer is not particularly limited, and known materials can be applied. Among them, the blackening layer preferably contains at least one metal atom selected from the group consisting of Mo, Nb, Cr, Ti, W, Ni, Ta, V, Fe, Co, Cu, Sn, and Mn, and more preferably contains at least one metal atom selected from the group consisting of Mo, Nb, Cr, Ti, and W.

The blackening layer may contain atoms other than the metal atom (for example, a carbon atom, an oxygen atom, a nitrogen atom, and a hydrogen atom).

The blackening layer may contain a single metal consisting of the above-described metal atom or a metal alloy consisting of two or more kinds of metal atoms. Further, the blackening layer may contain oxides, nitrides, or oxynitrides of the above-described metal atoms.

The thickness of the blackening layer is not particularly limited; however, it is preferably 1 to 100 nm and more preferably 3 to 30 nm from the viewpoints of the sufficient suppression of the reflection of light and the industrial excellency.

The intimate attachment layer is a layer for ensuring the adhesiveness between the blackening layer and the metal conductive layer.

The material constituting the intimate attachment layer is not particularly limited, and known materials can be applied. Among them, the intimate attachment layer preferably contains at least one metal atom selected from the group consisting of Mo, Nb, Cr, Ti, W, Ni, Ta, V, Fe, Co, Cu, Sn, and Mn, and more preferably contains at least one metal atom selected from the group consisting of Mo, Nb, Cr, Ti, and W.

The intimate attachment layer may contain atoms other than the metal atom (for example, a carbon atom, an oxygen atom, a nitrogen atom, and a hydrogen atom).

The intimate attachment layer may contain a single metal consisting of the above-described metal atom or a metal alloy consisting of two or more kinds of metal atoms. Further, the intimate attachment layer may contain oxides, nitrides, or oxynitrides of the above-described metal atoms.

It is preferable that the blackening layer and the intimate attachment layer contain the same metal atom from the viewpoint that the adhesiveness between the blackening layer and the intimate attachment layer is better.

Further, even in a case where the intimate attachment layer and the blackening layer have the same constitutional components, the functions may differ in a case where the constitutional components have different densities. The densities of the intimate attachment layer and the blackening layer may change depending on the conditions (for example, the conditions of the sputtering method) at the time of the formation.

The thickness of the intimate attachment layer is not particularly limited; however, it is preferably 1 to 100 nm and more preferably 20 to 60 nm in that the effects of the present invention are more excellent.

The metal conductive layer is a member that can impart conductivity to the conductive laminate.

The material constituting the metal conductive layer is not particularly limited, and known materials can be applied. Among them, the metal conductive layer preferably contains at least one metal atom selected from the group consisting of Cu, Al, Ag, Pt, Ni, and Pd, and more preferably at least one metal atom selected from the group consisting of Cu, Al, and Ag.

The metal conductive layer may contain a single metal consisting of the above-described metal atom or a metal alloy consisting of two or more kinds of metal atoms.

The thickness of the metal conductive layer is not particularly limited; however, it is preferably 10 to 700 nm and more preferably 100 to 600 nm from the viewpoint of conductivity.

The fine metal wire may include a layer other than the blackening layer, the intimate attachment layer, and the metal conductive layer.

For example, the fine metal wire may include an intimate attachment layer and a protective layer on the surface of the metal conductive layer on a side opposite to the intimate attachment layer.

The intimate attachment layer arranged between the metal conductive layer and the protective layer is a layer for ensuring the adhesion between the two layers. Examples of the configuration of the intimate attachment layer include the configuration of the intimate attachment layer that is arranged between the blackening layer and the metal conductive layer, which is described above.

The protective layer is a layer having the role of protecting the metal conductive layer.

Examples of the configuration of the protective layer include the same configuration as that of the blackening layer described above.

The shape of the fine metal wire is not particularly limited; however, a shape in which the line width of the fine metal wire gradually decreases from the side of the first organic film to the side of the second organic film is preferable (see FIG. 1). That is, the fine metal wire preferably has a tapered cross-sectional shape. In a case where the fine metal wire has the above shape, the fine metal wire is more difficult to be visible.

The angle ($\theta 1$ in FIG. 1, hereinafter, also referred to as a taper angle) that is formed by the inclined surface of the fine metal wire having a tapered cross-sectional shape and the surface of the first organic film is not particularly limited; however, it is preferably 60 to 80°.

Further, the line width of the blackening layer on the side of the first organic film may be different from the line width of the metal conductive layer on the side of the first organic film, and the ratio $\{(W2/W1) \times 100(\%)\}$ (see FIG. 1) of the line width W2 of the metal conductive layer on the side of the first organic film with respect to the line width W1 of the blackening layer on the side of the first organic film is preferably 90% to 99.9%. Within the above range, the fine metal wire is more difficult to be visible.

The line width of the fine metal wire is not particularly limited, and it is preferably 30 μm or less, more preferably 15 μm or less, still more preferably 10 μm or less, particularly preferably 9 μm or less, and most preferably 7 μm or less, and preferably 0.5 μm or more, and more preferably 1.0 μm or more. Within the above range, it is possible to form an electrode having low resistance and difficult to be visible.

The line width of the fine metal wire means the largest line width among the fine metal wires, and in the case of the fine metal wire having a tapered cross-sectional shape as illustrated in FIG. 1, the line width of the blackening layer on the side of the first organic film corresponds to the line width of the fine metal wire.

The thickness of the fine metal wire is not particularly limited, and it is preferably 0.01 to 20 μm, more preferably 0.01 to 10 μm, and still more preferably 0.01 to 5 μm. Within the above range, it is possible to form an electrode having low resistance and difficult to be visible.

The fine metal wires may form a pattern, which is not particularly limited, and for example, the pattern thereof is preferably a triangle such as a regular triangle, an isosceles triangle, or a right triangle, a quadrangle (for example, a square, a rectangle, a rhombus, a parallelogram, or a trapezoid), a (regular) n-polygon such as a (regular) hexagon and a (regular) octagon, a circle, an ellipse, a star shape, or a geometric shape that is obtained by combining these, and more preferably a mesh shape (a mesh pattern).

Figure 2:
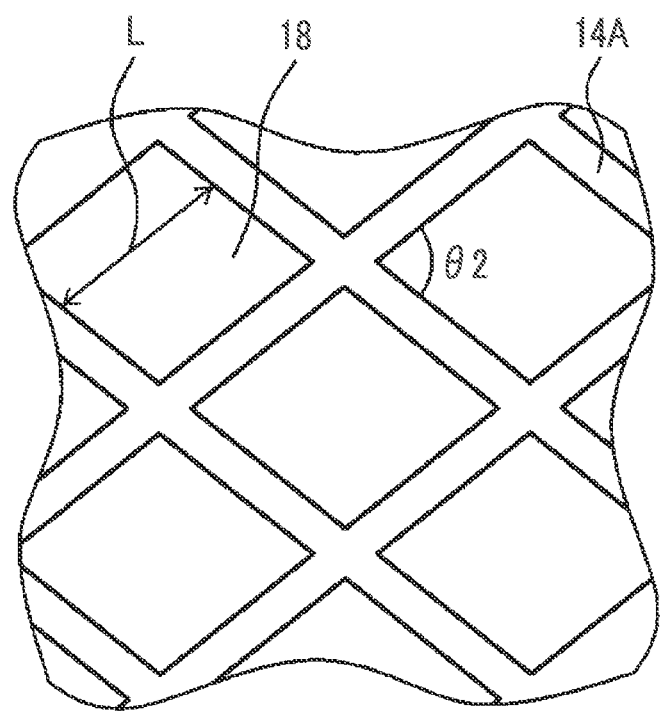
FIG. 2 is a partial plan view illustrating a mesh pattern composed of intersecting fine metal wires.

As the mesh shape, a shape including a plurality of opening portions 18 composed of the intersecting fine metal wires 14A as illustrated in FIG. 2 is mentioned. The length L of one side of the opening portion 18 is not particularly limited; however, it is preferably 1,500 μm or less, more preferably 1,300 μm or less, and still more preferably 1,000 μm or less, and more preferably 5 μm or more, more preferably 30 μm or more, and still more preferably 80 μm or more.

In a case where the length of one side of the opening portion is within the above range, the transparency of the conductive laminate is better.

In FIG. 2, the opening portion 18 has a rhombus shape; however, it may have another shape. For example, the shape may be a polygonal shape (for example, a triangle, a quadrangle, a hexagon, or a random polygonal shape). Further, the shape of one side may be a curved shape or may be a circular arc shape in addition to a straight line shape. In the case of the circular arc shape, for example, two sides facing each other may have a circular arc shape protruding outward, and the other two sides facing each other may have a circular arc shape protruding inward. Further, the shape of each of the sides may be a wavy line shape in which a circular arc protruding outward and a circular arc protruding inward are continuous. Of course, the shape of each of the sides may be a sine curve.

From the viewpoint of visible light transmittance, the opening ratio of the mesh pattern formed by the fine metal wire is preferably 85% or more, more preferably 90% or more, and still more preferably 95% or more. The opening ratio corresponds to the proportion of the region on the first organic film excluding the region where the fine metal wire is present to the entire region.

The method for forming a fine metal wire is not particularly limited, and examples thereof include known methods such as a sputtering method, an ion plating method, and a vapor deposition method.

In addition, Examples of the method for forming a fine metal wire at a predetermined position also include known methods. One example thereof is a method in which a blackening layer, an intimate attachment layer, and a metal conductive layer are formed on the entire surface of the first organic film by a sputtering method, a patterned resist film is subsequently formed on the metal conductive layer, and the blackening layer, the intimate attachment layer, and the metal conductive layer of the opening portion of the resist film are removed to arrange the fine metal wire at a predetermined position.

As a method for removing an unnecessary layer, any one of wet etching (for example, etching using an etchant) or dry etching may be used.

(Second Organic Film)

The second organic film is one of the members that support the fine metal wire together with the first organic film described above.

The configuration of the second organic film is the same as the configuration of the first organic film described above. For example, the range of the moisture content of the second organic film is the same as the range of the moisture content of the first organic film described above.

The thickness of the second organic film is preferably 0.5 to 5.0 μm and more preferably 1.0 to 3.0 μm in that the second organic film covers the fine metal wire and the surface of the second organic film becomes smooth.

Further, the suitable aspect of the material constituting the second organic film is the same as the suitable aspect of the material constituting the first organic film.

The method for forming the second organic film is the same as the method for forming the first organic film described above.

It is preferable that the first organic film and the second organic film are made of the same material in that the effects of the present invention are more excellent. In a case of being composed of the same material, the adhesiveness between the first organic film and the second organic film is also improved.

The conductive laminate can be manufactured by known methods.

Among them, the conductive laminate is preferably manufactured by a method having a step of forming the first organic film, a step of forming a fine metal wire on the first organic film, and a step of forming the second organic film to cover the fine metal wire.

The specific manufacturing method for each of the members (the first organic film, the fine metal wire, and the second organic film) is as described above.

The conductive laminate may include a member other than those described above.

For example, between the first organic film and the second organic film, a conductive portion (for example, a conductive terminal portion arranged at both ends of a mesh pattern consisting of fine metal wires) other than the fine metal wire may be arranged.

Second Embodiment

Figure 3:
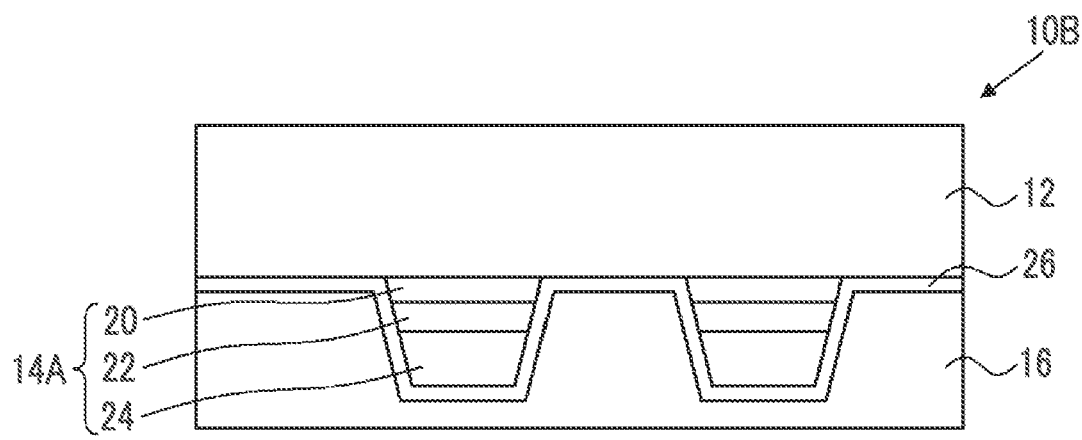
FIG. 3 is a cross-sectional view of a second embodiment of the conductive laminate.

Hereinafter, a second embodiment of the conductive laminate according to the embodiment of the present invention will be described with reference to the drawings. FIG. 3 shows a cross-sectional view of the second embodiment of the conductive laminate according to the embodiment of the present invention.

A conductive laminate 10B includes a first organic film 12, a fine metal wire 14A, an inorganic film 26, and a second organic film 16. The fine metal wire 14A includes a blackening layer 20, an intimate attachment layer 22, and a metal conductive layer 24 in order from a side of the first organic film 12.

The conductive laminate 10B has the same configuration as the conductive laminate 10A except for the inclusion of the inorganic film 26, and the same configuration elements are designated by the same reference numeral, and the description will be omitted.

Hereinafter, the inorganic film 26 will be described in detail.

(Inorganic Film)

The inorganic film is a film arranged between the first organic film and the second organic film to cover the fine metal wire. Since the inorganic film is arranged, the effects of the present invention are more excellent.

The material constituting the inorganic film is not particularly limited, and the inorganic film preferably contains at least one metal atom selected from the group consisting of Si, Al, and Ti.

The inorganic film may contain atoms other than the metal atom (for example, a carbon atom, an oxygen atom, a nitrogen atom, and a hydrogen atom).

The inorganic film may contain oxides, nitrides, or oxynitrides of the above-described metal atoms and preferably contains at least one selected from the group consisting of $SiO_2$, SiON, SiN, $Al_2O_3$, and $TiO_2$.

The thickness of the inorganic film is not particularly limited, and it is preferably 10 to 1,000 nm and more preferably 20 to 200 nm.

As illustrated in FIG. 3, the inorganic film may be arranged to cover the first organic film and the fine metal wire or may be arranged to cover only the fine metal wire.

The method for forming the inorganic film is not particularly limited, and examples thereof include known methods such as a sputtering method, an ion plating method, a chemical vapor deposition method (CVD), and a liquid phase growth method such as a plating method or a sol-gel method.

Third Embodiment

Figure 4:
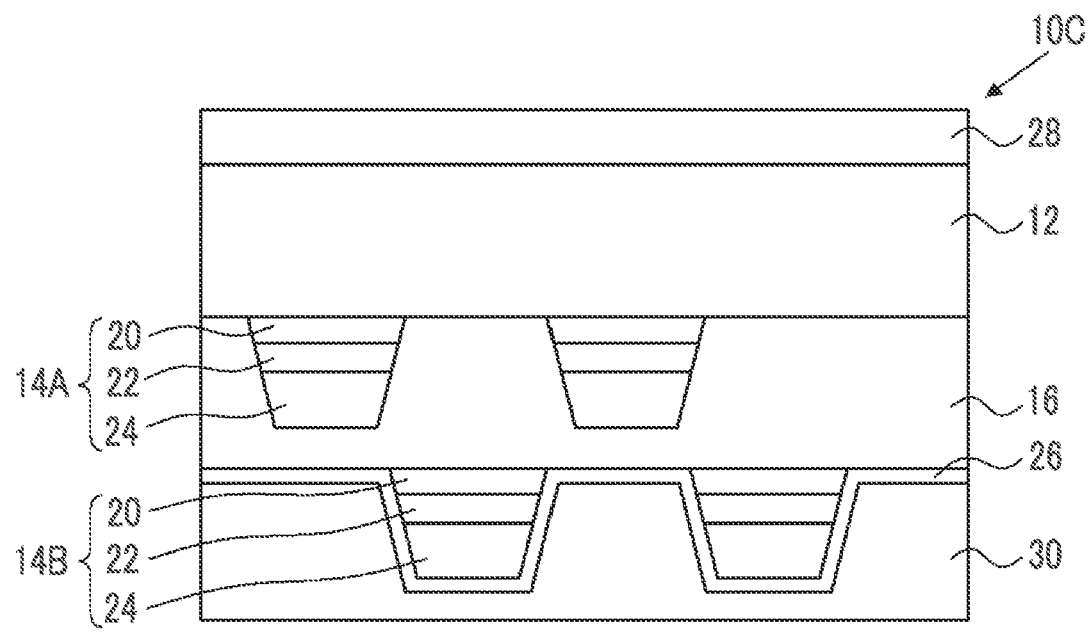
FIG. 4 is a cross-sectional view of a third embodiment of the conductive laminate.

Hereinafter, a third embodiment of the conductive laminate according to the embodiment of the present invention will be described with reference to the drawings. FIG. 4 shows a cross-sectional view of the third embodiment of the conductive laminate according to the embodiment of the present invention.

A conductive laminate 10C includes a support 28, the first organic film 12, the fine metal wire 14A, the second organic film 16, a fine metal wire 14B, the inorganic film 26, and a third organic film 30. The fine metal wire 14A and the fine metal wire 14B each include the blackening layer 20, the intimate attachment layer 22, and the metal conductive layer 24 in order from a side of the first organic film 12.

In a case where the conductive laminate 10C is applied to a touch panel, it is preferable to arrange the conductive laminate 10C in the touch panel so that the blackening layer 20 in the fine metal wire 14A is arranged on the visible side from the metal conductive layer 24. That is, it is preferable that the support 28 is arranged on the visible side of the touch panel. In this case, the support 28 may constitute a touch surface on the touch panel.

The first organic film 12, the fine metal wire 14A, and the second organic film 16 in the conductive laminate 10C respectively correspond to the first organic film 12, the fine metal wire 14A, and the second organic film 16 in the conductive laminate 10A, and thus the description thereof will be omitted.

Hereinafter, the support 28, the fine metal wire 14B (hereinafter, also referred to as the "second fine metal wire"), the inorganic film 26, and the third organic film 30, which are included in the conductive laminate 10C, will be described in detail.

(Support)

The support is a member for supporting another member. More specifically, it functions as a member in a case of forming the first organic film.

The kind of the support is not particularly limited, and examples thereof include a glass substrate and a resin substrate, and a glass substrate is preferable from the viewpoint of transparency and light resistance.

Examples of the material constituting the resin substrate include a thermoplastic resin, and examples of the thermoplastic resin include a polyester resin such as polyethylene terephthalate, a methacrylic resin, a methacrylic acid-maleic acid copolymer, a polystyrene resin, a transparent fluororesin, polyimide, a fluorinated polyimide resin, a polyamide resin, a polyamide imide resin, a polyether imide resin, a cellulose acylate resin, a polyurethane resin, a polyether ether ketone resin, a polycarbonate resin, an alicyclic polyolefin resin, a polyarylate resin, a polyether sulfone resin, a polysulfone resin, a cycloolefin copolymer, a fluorene ring-modified polycarbonate resin, an alicyclic modified polycarbonate resin, and a fluorene ring-modified polyester resin.

The thickness of the support is not particularly limited and is 25 to 500 μm in many cases.

The total light transmittance of the support is preferably 85% to 100%.

As the support, a temporary support (a peelable support) can also be used. In a case where a temporary support is used as the support, the member arranged on the temporary support can be transferred to another object to be bonded. In that case, peeling occurs between the temporary support and the first organic film, and the temporary support can be separated.

(Second Fine Metal Wire)

The second fine metal wire is a fine wire arranged between the second organic film and the third organic film.

The configuration of the second fine metal wire is the same as the configuration of the fine metal wire described in the first embodiment described above.

(Inorganic Film)

The inorganic film is a film arranged between the second organic film and the third organic film to cover the second fine metal wire. Since the inorganic film is arranged, the effects of the present invention are more excellent.

The configuration of the inorganic film is the same as the configuration of the inorganic film described in the second embodiment described above.

(Third Organic Film)

The third organic film is a film arranged to cover the second fine metal wire.

The configuration of the third organic film is the same as the configuration of the first organic film described in the first embodiment described above. For example, the range of the moisture content of the third organic film is the same as the range of the moisture content of the first organic film described above.

In addition, the suitable range of the thickness of the third organic film is the same as the suitable range of the thickness of the first organic film described above.

Further, the suitable aspect of the material constituting the third organic film is the same as the suitable aspect of the material constituting the first organic film.

The method for forming the third organic film is the same as the method for forming the first organic film described above.

The conductive laminate according to the embodiment of the present invention can be suitably used for a touch panel.

The kind of the touch panel having the conductive laminate according to the embodiment of the present invention is not particularly limited, and the touch panel can be appropriately selected depending on the intended purpose. Examples thereof include a surface type capacitance type touch panel, a projection type capacitance type touch panel, and a resistive film type touch panel. The touch panel includes a so-called touch sensor and a so-called touch pad.

The touch panel is applied to various display devices (a liquid crystal display device, an organic electroluminescence display device, and the like).

EXAMPLES

Hereinafter, the present invention will be described in more detail based on Examples; however, the present invention is not limited to these.

Example 1

(Preparation of Support)

The surface of a glass substrate (EAGLE XG glass, manufactured by Corning Incorporated) with a 10 cm×10 cm square was subjected to an ultraviolet (UV) ozone treatment for 5 minutes. Then, the treated glass substrate was immersed in an aqueous solution obtained by diluting Clean Ace manufactured by AS ONE Corporation to 30% by mass, and the surface of the glass substrate was scrubbed with Bell Clean manufactured by AION Co., Ltd. Then, the scrubbed glass substrate was immersed in pure water, and the surface of the glass substrate was scrubbed with Bell Clean in the same manner as described above. Then, the scrubbed glass substrate was subjected to air blowing and dried at 200° C. for 30 minutes.

(Formation of First Organic Film)

Trimethylolpropane triacrylate (manufactured by Toagosei Co., Ltd.) and a photopolymerization initiator (ESACURE KTO46, manufactured by Lamberti S.p.A) were mixed at a ratio of 95.5% by mass:4.5% by mass, and then dissolved in methyl ethyl ketone so that the solid content concentration was 10% by mass, whereby a composition for forming an organic film was obtained.

Next, the glass substrate undergone the washing treatment was coated with the composition for forming an organic film using an applicator bar (effective width: 20 mm) with an automatic applicator PI1210 manufactured by TESTER SANGYO Co., Ltd., and then dried at 120° C. for 3 minutes to form a coating film. The coating speed was 100 mm/sec.

Next, using a metal halide lamp MAL625NL manufactured by GS Yuasa Corporation, the coating film was irradiated with UV (600 mJ/cm$^2$) under the conditions of an oxygen concentration of 200 ppm by volume and a temperature of 80° C. to obtain a cured film. Then, the cured film was dried at 80° C. for 12 hours under vacuum to obtain a first organic film (thickness: 1.5 μm).

(Formation of First Fine Metal Wire)

A MoNb film (Mo content: 80% by mass, Nb content: 20% by mass) having a film thickness of 10 nm was formed on the obtained first organic film by a magnetron sputtering method. The conditions of the magnetron sputtering method were a magnetic field strength of 1,000 Gauss, a substrate temperature of 30° C., a degree of vacuum of 5.0×10$^{-2}$ Pa, an electric power of 7 kW, and a film formation rate of 0.8 nm/min.

Next, a MoNb film (Mo content: 80% by mass, Nb content: 20% by mass) having a film thickness of 40 nm was formed on the MoNb film by a magnetron sputtering method. The conditions of the magnetron sputtering method were a magnetic field strength of 1,000 Gauss, a substrate temperature of 30° C., a degree of vacuum of 5.0×10$^{-2}$ Pa, an electric power of 8 kW, and a film formation rate of 0.6 nm/min.

Next, a Cu film having a film thickness of 200 nm was formed on the MoNb film by a magnetron sputtering method. The conditions of the magnetron sputtering method were a magnetic field strength of 1,000 Gauss, a substrate temperature of 30° C., a degree of vacuum of 5.0×10$^{-2}$ Pa, an electric power of 5 kW, and a film formation rate of 0.4 nm/min.

Next, a CuNi film having a film thickness of 80 nm (Cu content: 75% by mass, Ni content: 25% by mass) was formed on the Cu film by a magnetron sputtering method. The conditions of the magnetron sputtering method were a magnetic field strength of 1,000 Gauss, a substrate temperature of 30° C., a degree of vacuum of 5.0×10$^{-2}$ Pa, an electric power of 6 kW, and a film formation rate of 0.8 nm/min.

Next, a MoNb film (Mo content: 80% by mass, Nb content: 20% by mass) having a film thickness of 100 nm was formed on the CuNi film by a magnetron sputtering method. The conditions of the magnetron sputtering method were a magnetic field strength of 1,000 Gauss, a substrate temperature of 30° C., a degree of vacuum of 5.0×10$^{-2}$ Pa, an electric power of 4 kW, and a film formation rate of 0.5 nm/min.

In the magnetron sputtering method, argon was used as the inert gas.

Next, the formed laminated film was coated with OAP manufactured by Tokyo Ohka Kogyo Co., Ltd. Next, the coating was further carried out with Novolak OFPR800, manufactured by Tokyo Ohka Kogyo Co., Ltd., as a patterning resist. For the above coating, a spin coater 1H-D7 manufactured by Mikasa Co., Ltd. was used. After the above coating, drying was carried out at 90° C. for 3 minutes to obtain a resist film having a film thickness of 1 μm.

Next, the resist film was irradiated with light using a mask aligner MA-20 (with mercury light source) manufactured by Mikasa Co., Ltd. for 10 seconds and a mesh photo mask. Thereafter, the resist film was immersed in an aqueous solution containing 2.38% NMD-W manufactured by Tokyo Ohka Kogyo Co., Ltd. for 5 minutes, subsequently immersed in pure water for 1 minute, and then dried at 120° C. for 3 minutes to obtain a patterned resist film.

A glass substrate having the patterned resist film was immersed in an etchant (a ferric chloride solution: manufactured by Toagosei Co., Ltd.) kept warm at 50° C. for 1 minute, subsequently immersed in pure water for 5 minutes, subjected to air blowing, and then dried at 120° C. for 3 minutes to obtain a mesh-shaped fine metal wire as illustrated in FIG. 2.

The formed fine metal wire included a MoNb film (a blackening layer), a MoNb film (an intimate attachment layer), a Cu film (a metal conductive layer), a CuNi film (an intimate attachment layer), and a MoNb film (a protective layer) in order. In addition, the fine metal wire had a tapered cross-sectional shape as illustrated in FIG. 1, the line width of the fine metal wire (corresponding to the line width on the first organic film side of the blackening layer) was 4.0 μm, the taper angle θ1 was 70°, and the ratio of the line width W2 of the metal conductive layer on the side of the first organic film with respect to the line width W1 of the blackening layer on the side of the first organic film was 97%.

Figure 5:
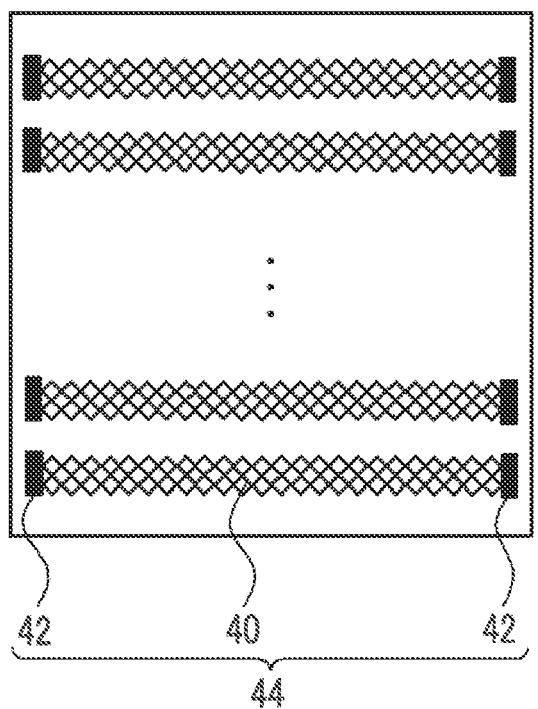
FIG. 5 is a schematic view of a metal wiring pattern formed in Examples.

Further, as illustrated in FIG. 5, twenty units 44 each consisting of a mesh pattern 40 formed by the mesh-shaped first fine metal wire and consisting of two resistance value measurement terminals 42 sandwiching the mesh pattern 40 were arranged on the first organic film. The length of one side of the mesh-shaped opening portion of the mesh pattern was 500 μm, and one (the angle θ2 in FIG. 2) of the angles of the rhombus-shaped opening portion was 65°. The size of the resistance value measurement terminal 42 was 2 mm×1 mm, and the distance between the units 44 was 2 mm.
(Formation of Second Organic Film)

A second organic film having a thickness of 2.5 μm was formed on the first organic film on which the fine metal wire had been formed according to the same procedure as (Formation of first organic film) described above.
(Formation of Second Fine Metal Wire)

A mesh-shaped second fine metal wire was formed on the second organic film according to the same procedure as (first fine metal wire) described above. However, the mesh-shaped second fine metal wire was formed so that the intersection of the mesh pattern formed by the first fine metal wire was positioned at the opening portion of the mesh pattern formed by the second fine metal wire.

Figure 6:
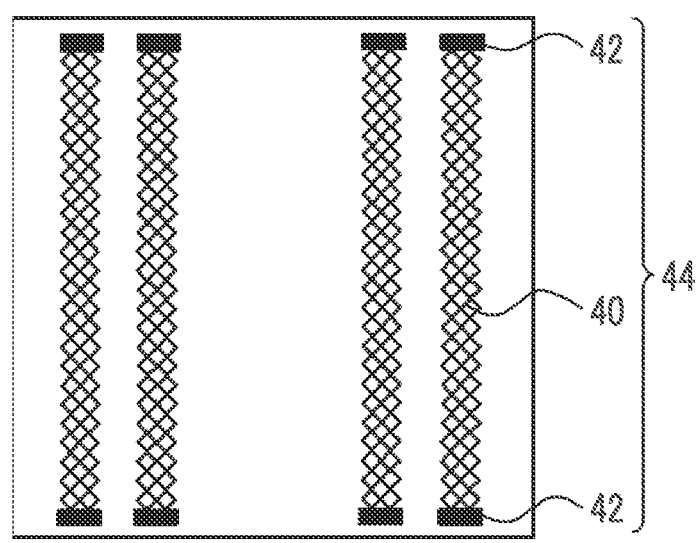
FIG. 6 is a schematic view of a metal wiring pattern formed in Examples.

Further, as illustrated in FIG. 6, twenty units 44 each consisting of a mesh pattern 40 formed by the mesh-shaped second fine metal wire and consisting of two resistance value measurement terminals 42 sandwiching the mesh pattern 40 were arranged on the second organic film. The size of the resistance value measurement terminal 42 was 2 mm×1 mm, and the distance between the units 44 was 2 mm. It is noted that in FIG. 5 and FIG. 6, the arrangement direction of the units is different, and the arrangement direction of the units of the second fine metal wire was made to be orthogonal to the arrangement direction of the units of the first fine metal wire.
(Formation of inorganic film)

A $SiO_2$ film having a thickness of 50 nm was formed on the second organic film on which the second fine metal wire had been arranged, by a plasma CVD method.

In the plasma CVD method, as the raw material gas, silane gas, hydrogen gas, and oxygen gas were used. The flow rate of silane gas was set to 100 sccm, the flow rate of hydrogen gas was set to 1,000 sccm, and the flow rate of oxygen gas was set to 200 sccm. The degree of vacuum was set to 50 Pa, the substrate temperature was set to 30° C., the electrode input electric power was set to 6.5 kW, and the film formation rate was set to 10 nm/min.
(Formation of Third Organic Film)

A second organic film having a thickness of 2.0 μm was formed on a $SiO_2$ film according to the same procedure as (Formation of first organic film) described above.

Figure 7:
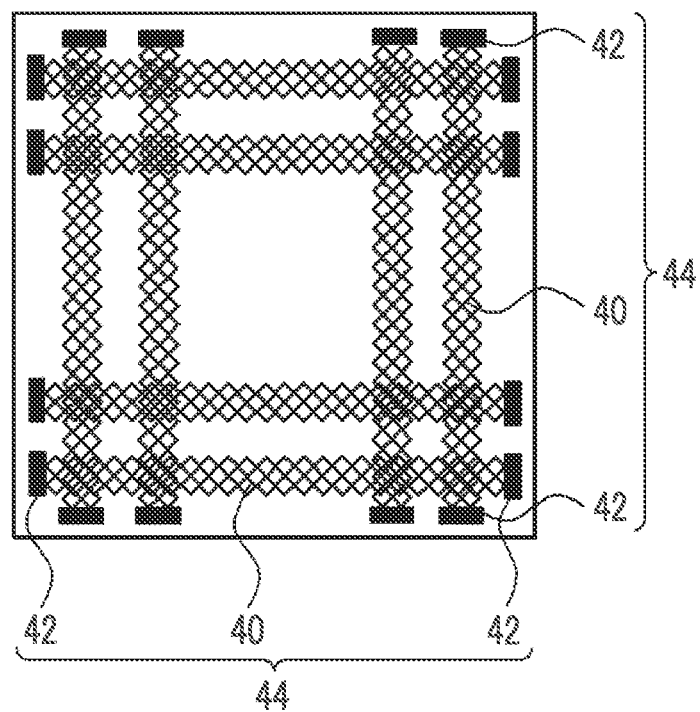
FIG. 7 is a schematic view of a metal wiring pattern formed in Examples.

A conductive laminate 1 such as a laminate as illustrated in FIG. 4, was obtained according to the above procedure. The mesh pattern was arranged to be a pattern as illustrated in FIG. 7 in a case where the conductive laminate 1 was observed from the upper surface thereof.

Example 2

A conductive laminate 2 was obtained according to the same procedure as in Example 1 except that the manufacturing conditions of each of the layers in (Formation of first fine metal wire) described above were changed as the following (Manufacturing condition 2).

The first fine metal wire and the second fine metal wire in the conductive laminate 2 respectively included a $Mo_2N$ film (a blackening layer), a Mo film (an intimate attachment layer), an Al film (a metal conductive layer), a Mo film (an intimate attachment layer), and a $Mo_2N$ film (a protective layer) in order.
(Manufacturing Condition 2)

A $Mo_2N$ film having a film thickness of 10 nm was formed on the obtained first organic film by a magnetron sputtering method. The conditions of the magnetron sputtering method were a magnetic field strength of 1,000 Gauss, a substrate temperature of 30° C., a degree of vacuum of $5.0 \times 10^{-2}$ Pa, an electric power of 10 kW, and a film formation rate of 0.5 nm/min.

Next, a Mo film having a film thickness of 40 nm was formed on the $Mo_2N$ film by a magnetron sputtering method. The conditions of the magnetron sputtering method were a magnetic field strength of 1,000 Gauss, a substrate temperature of 30° C., a degree of vacuum of $5.0 \times 10^{-2}$ Pa, an electric power of 8 kW, and a film formation rate of 0.6 nm/min.

Next, an Al film having a film thickness of 200 nm was formed on the Mo film by a magnetron sputtering method. The conditions of the magnetron sputtering method were a magnetic field strength of 1,000 Gauss, a substrate temperature of 30° C., a degree of vacuum of $5.0 \times 10^{-2}$ Pa, an electric power of 6 kW, and a film formation rate of 0.4 nm/min.

Next, a Mo film having a film thickness of 80 nm was formed on the Al film by a magnetron sputtering method. The conditions of the magnetron sputtering method were a magnetic field strength of 1,000 Gauss, a substrate temperature of 30° C., a degree of vacuum of $5.0 \times 10^{-2}$ Pa, an electric power of 4 kW, and a film formation rate of 0.3 nm/min.

Next, a $Mo_2N$ film having a film thickness of 100 nm was formed on the Mo film by a magnetron sputtering method. The conditions of the magnetron sputtering method were a magnetic field strength of 1,000 Gauss, a substrate temperature of 30° C., a degree of vacuum of $5.0 \times 10^{-2}$ Pa, an electric power of 7 kW, and a film formation rate of 0.4 nm/min.

In the magnetron sputtering method, nitrogen was used as the reaction gas, and argon was used as the inert gas.

Examples 3 to 5

Conductive laminates 3 to 5 were obtained according to the same procedure as in Example 1 except that the materials shown in Table 1 were used instead of trimethylolpropane triacrylate.

Examples 6 and 7

Conductive laminates 6 and 7 were obtained according to the same procedure as in Example 1 except that the procedure of (Formation of first organic film) described above was changed as follows.

In the conductive laminates 6 and 7, all of the first organic film to the third organic film were formed using the materials shown in Table 1. The thicknesses of the first organic film to the third organic film of the conductive laminates 6 and 7 were respectively the same as the thicknesses of the first organic film to the third organic film of the conductive laminate 1.
(Formation of First Organic Film)

BR113 (manufactured by Mitsubishi Chemical Corporation) or BR95 (manufactured by Mitsubishi Chemical Corporation) was dissolved in methyl ethyl ketone so that the solid content concentration was 10% by mass, whereby a composition for forming an organic film was obtained.

Next, the glass substrate undergone the washing treatment was coated with the composition for forming an organic film using an applicator bar (effective width: 20 mm) with an automatic applicator PI1210 manufactured by TESTER SANGYO Co., Ltd., and then dried at 120° C. for 3 minutes to form a first organic film. The coating speed was 100 mm/sec.

Example 8

A conductive laminate 8 was obtained according to the same procedure as in Example 1 except that the procedure of (Formation of first organic film) described above was changed as follows.

In the conductive laminate 8, all of the first organic film to the third organic film were formed using the materials shown in Table 1. The thicknesses of the first organic film to the third organic film of the conductive laminate 8 were respectively the same as the thicknesses of the first organic film to the third organic film of the conductive laminate 1.
(Formation of First Organic Film)

The glass substrate undergone the washing treatment was coated with SILPLUS HT100 (manufactured by NIPPON STEEL Chemical & Material Co., Ltd.) using an applicator bar (effective width: 20 mm) with an automatic applicator PI1210 manufactured by TESTER SANGYO Co., Ltd. and then dried at 120° C. for 3 minutes to form a coating film. The coating speed was 100 mm/sec.

Next, using a metal halide lamp MAL625NL manufactured by GS Yuasa Corporation, the coating film was irradiated with UV (1,000 mJ/cm$^2$) under the conditions of an oxygen concentration of 200 ppm by volume to obtain a cured film.

Examples 9 to 12

Conductive laminates 9 to 12 were obtained according to the same procedure as in Example 1 except that the procedure of (Formation of first organic film) described above was changed as follows, and the line width of the fine metal wire (corresponding to the line width of the blackening layer on the side of the first organic film) and the thickness of the metal conductive layer were changed as shown in Table 1.

In the conductive laminates 9 to 12, all of the first organic film to the third organic film were formed using the materials shown in Table 1. The thicknesses of the first organic film to the third organic film of the conductive laminate 9 were respectively the same as the thicknesses of the first organic film to the third organic film of the conductive laminate 1.
(Formation of First Organic Film)

A dibutyl ether solution (AQUAMICA NN120-20: manufactured by AZ Electronic Materials) containing 20% by mass of a noncatalytic perhydropolysilazane and a dibutyl ether solution (AQUAMICA NAX120-20: manufactured by AZ Electronic Materials) containing 5% by mass (solid content) of an amine catalyst (N,N,N',N'-tetramethyl-1,6-diaminohexane) were mixed to prepare a composition for forming an organic film. The content of the amine catalyst in the obtained composition for forming an organic film was 1% by mass with respect to the total solid content.

Next, the glass substrate undergone the washing treatment was coated with the composition for forming an organic film using an applicator bar (effective width: 20 mm) with an automatic applicator PI1210 manufactured by TESTER SANGYO Co., Ltd., and then dried at 120° C. for 3 minutes to form a coating film. The coating speed was 100 mm/sec.

Next, using a metal halide lamp MAL625NL manufactured by GS Yuasa Corporation, the coating film was irradiated with UV (5,000 mJ/cm$^2$) under the conditions of an oxygen concentration of 200 ppm by volume and a temperature of 100° C. to obtain a cured film. Then, the obtained cured film was dried at 80° C. for 12 hours to obtain a first organic film.

Example 13

A conductive laminate 13 was obtained according to the same procedure as in Example 9 except that the manufacturing conditions of each of the layers in (Formation of first fine metal wire) described above were changed as (Manufacturing condition 2) described above.

Comparative Examples 1 to 3

Conductive laminates C1 to C3 were obtained according to the same procedure as in Example 1 except that the monomers shown in Table 1 were used instead of trimethylolpropane triacrylate.

In Comparative Example 3, styrene was mixed with A9300 at a mass ratio of 1:1.
<Evaluation>
(Evaluation of Moisture Content)

Each of the organic films (thickness: 1.5 µm) was manufactured on a glass support according to the above-described procedures of (Formation of first organic film) of Examples 1 to 13 and Comparative Examples 1 to 3.

The obtained organic film was scraped off from the glass support and allowed to stand for 24 hours in an environment of a temperature of 25° C. and a humidity of 50%, and then the obtained organic film was used to measure the moisture content of the organic film by the Karl Fischer method (150° C., vaporization method). AQV-2100 manufactured by HIRANUMA Co., Ltd. was used for the measurement device.

The results are summarized in Table 1.

(Disconnection Evaluation)

One hundred conductive laminates of each of Examples and Comparative Examples were manufactured.

After allowing the conductive laminates to stand in an environment of 50° C. for one week, probes were applied to resistance measuring terminal portions that are present at both ends of each unit, and the resistance value was measured with a resistance measuring device. The case where even one unit was disconnected, among the total of forty units in each of the conductive laminate, was counted as the disconnection occurrence of the wire and included in the number of disconnection occurrences.

Regarding the one hundred samples measured, 1 point was assigned to a case where the number of samples in which disconnection occurred was 10 or more, 2 points were assigned to a case where the number of samples in which disconnection occurred was 3 to 9, 3 points were assigned to a case where the number of samples in which disconnection occurred was 1 or 2, and 4 points were assigned to a case where the number of samples in which disconnection occurred was 0.

Each of the terms in the "Material" column in Table 1 represents the following.

TMPTA: trimethylolpropane triacrylate (manufactured by Toagosei Co., Ltd.)

AD-TMP: ditrimethylolpropane tetraacrylate (manufactured by SHIN-NAKAMURA CHEMICAL Co, Ltd.)

A-DCP: tricyclodecanedimethanol diacrylate (manufactured by SHIN-NAKAMURA CHEMICAL Co, Ltd.)

EA-0250P: 9,9-bis[4-(2-acryloyloxyethoxy)phenyl]fluorene (manufactured by Osaka Gas Chemicals Co., Ltd.)

BR-113: DIANAL BR-113 (manufactured by Mitsubishi Chemical Corporation)

BR95: DIANAL BR-95 (manufactured by Mitsubishi Chemical Corporation)

SILPLUS HT100: SILPLUS HT100 (manufactured by NIPPON STEEL Chemical & Material Co., Ltd.)

Polysilazane: a mixture of a dibutyl ether solution (AQUAMICA NN120-20: manufactured by AZ Electronic Materials) containing perhydropolysilazane and a dibutyl ether solution (AQUAMICA NAX120-20: manufactured by AZ Electronic Materials) containing an amine catalyst (N,N,N',N'-tetramethyl-1,6-diaminohexane)

A9300: an ethoxylated isocyanuric acid triacrylate (manufactured by SHIN-NAKAMURA CHEMICAL Co, Ltd.)

The "Moisture content" in Table 1 indicates the moisture content of the organic film (the first organic film to the third organic film) in each of the conductive laminates.

In the "Fine metal wire" column in Table 1, "A" represents a case where the formed fine metal wire is a MoNb film (a blackening layer), a MoNb film (an intimate attachment layer), a Cu film (a metal conductive layer), a CuNi film (an intimate attachment layer), and a MoNb film (a protective layer), and "B" represents a case where the formed fine metal wire is a $Mo_2N$ film (a blackening layer), a Mo film (an intimate attachment layer), an Al film (a metal conductive layer), a Mo film (an intimate attachment layer), and a $Mo_2N$ film (a protective layer).

The "Line width of fine metal wire (μm)" in Table 1 represents a line width of the fine metal wire (a line width of the blackening layer on the side of the first organic film).

The "Metal conductive layer thickness (μm)" in Table 1 represents a thickness of the metal conductive layer in the fine metal wire.

TABLE 1

| | Organic film | | Fine metal wire | Line width of fine metal wire (μM) | Metal conductive layer thickness (nm) | Disconnection evaluation |
| | Material | Moisture content (%) | | | | |
|---|---|---|---|---|---|---|
| Example 1 | TMPTA | 1.50 | A | 4.0 | 200 | 2 |
| Example 2 | TMPTA | 1.50 | B | 4.0 | 200 | 2 |
| Example 3 | AD-TMP | 0.98 | A | 4.0 | 200 | 3 |
| Example 4 | A-DCP | 0.42 | A | 4.0 | 200 | 3 |
| Example 5 | EA-0250P | 0.32 | A | 4.0 | 200 | 3 |
| Example 6 | BR113 | 0.44 | A | 4.0 | 200 | 3 |
| Example 7 | BR95 | 0.47 | A | 4.0 | 200 | 3 |
| Example 8 | SILPLUS HT100 | 0.30 | A | 4.0 | 200 | 4 |
| Example 9 | Polysilazane | 0.25 | A | 1.5 | 200 | 4 |
| Example 10 | Polysilazane | 0.25 | A | 1.5 | 50 | 4 |
| Example 11 | Polysilazane | 0.25 | A | 4.0 | 200 | 4 |
| Example 12 | Polysilazane | 0.25 | A | 10.0 | 200 | 4 |
| Example 13 | Polysilazane | 0.25 | B | 4.0 | 200 | 4 |
| Comparative Example 1 | A9300 | 6.00 | A | 4.0 | 200 | 1 |
| Comparative Example 2 | Styrene | 5.00 | A | 4.0 | 200 | 1 |
| Comparative Example 3 | A9300 + styrene | 5.50 | A | 4.0 | 200 | 1 |

As shown in Table 1, the conductive laminates according to the embodiment of the present invention exhibit a desired effect.

Among them, it has been confirmed that in a case where the moisture content of the organic film is less than 1.00% (particularly, in a case of being 0.40% or less), a more excellent effect was exhibited.

EXPLANATION OF REFERENCES 10A, 10B, 10C: conductive laminate
12: first organic film
14A, 14B: fine metal wire 16: second organic film
18: opening portion
20: blackening layer
22: intimate attachment layer
24: metal conductive layer
26: inorganic film
28: support
30: third organic film
40: mesh pattern
42: resistance value measurement terminal
44: unit

What is claimed is:

1. A conductive laminate comprising:
a first organic film;
a fine metal wire arranged on the first organic film; and
a second organic film arranged to cover the fine metal wire,
wherein the fine metal wire includes a blackening layer, an intimate attachment layer, and a metal conductive layer in order from a side of the first organic film,
wherein moisture contents of the first organic film and the second organic film are less than 3.00%, and
wherein the blackening layer contains at least one metal atom selected from the group consisting of Mo, Nb, Cr, W, Ni, Ta, V, Co, Cu, Sn, and Mn.

2. The conductive laminate according to claim 1, wherein the moisture contents are less than 1.00%.

3. The conductive laminate according to claim 1, wherein the blackening layer and the intimate attachment layer contain the same metal atom.

4. The conductive laminate according to claim 1, wherein the first organic film and the second organic film are made of the same material.

5. The conductive laminate according to claim 1, wherein a line width of the fine metal wire gradually decreases from the side of the first organic film to a side of the second organic film.

6. The conductive laminate according to claim 1, wherein an inorganic film containing at least one metal atom selected from the group consisting of Si, Al, and Ti is arranged between the fine metal wire and the second organic film to cover the fine metal wire.

7. The conductive laminate according to claim 6, wherein the inorganic film contains at least one selected from the group consisting of $SiO_2$, SiON, SiN, $Al_2O_3$, and $TiO_2$.

8. The conductive laminate according to claim 1, wherein the metal conductive layer contains at least one metal atom selected from the group consisting of Cu, Al, and Ag.

9. The conductive laminate according to claim 1, wherein the blackening layer contains at least one metal atom selected from the group consisting of Mo, Nb, Cr and W.

10. The conductive laminate according to claim 1, further comprising a support on a side of the first organic film opposite to a side of the second organic film.

11. The conductive laminate according to claim 10, wherein the support is a glass substrate.

12. The conductive laminate according to claim 1, wherein the first organic film includes a silicon-containing resin.

13. The conductive laminate according to claim 1, wherein the blackening layer contains at least one metal atom selected from the group consisting of Nb and W.

14. A touch panel comprising the conductive laminate according to claim 1.

15. The conductive laminate according to claim 1, wherein the blackening layer contains at least one metal atom selected from the group consisting of Mo, Nb, W, Ni, Co, and Cu.

16. The conductive laminate according to claim 1, wherein the blackening layer contains at least one metal atom selected from the group consisting of Mo, Nb, W, and Cu.

17. A manufacturing method for a conductive laminate, comprising:
a step of forming a first organic film;
a step of forming a fine metal wire on the first organic film; and
a step of forming a second organic film to cover the fine metal wire,
wherein the fine metal wire includes a blackening layer, an intimate attachment layer, and a metal conductive layer in order from a side of first organic film,
wherein moisture contents of the first organic film and the second organic film are less than 3.00%, and
wherein the blackening layer contains at least one metal atom selected from the group consisting of Mo, Nb, Cr, W, Ni, Ta, V, Co, Cu, Sn, and Mn.

* * * * *